Mar. 13, 1923.

F. J. TONE

SAGGER STRUCTURE

Filed Feb. 6, 1922

1,448,011

INVENTOR
Frank J. Tone,
by Byrnes, Stebbins, Burgess & Carmelle,
his ATTORNEYS

Patented Mar. 13, 1923.

1,448,011

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

SAGGER STRUCTURE.

Application filed February 6, 1922. Serial No. 534,464.

*To all whom it may concern:*

Be it known that I, FRANK J. TONE, a citizen of the United States, residing at Niagara Falls, in the county of Niagara and State of New York, have invented a new and useful Improvement in Sagger Structures, of which the following is a full, clear, and exact description, reference being had to the accompanying drawings, in which—

Figure 1:
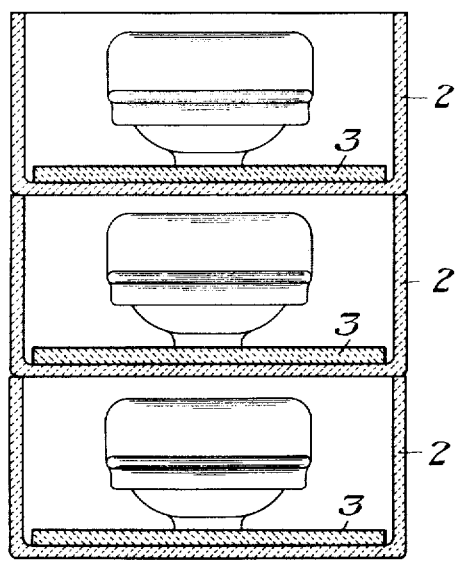
Figure 2:
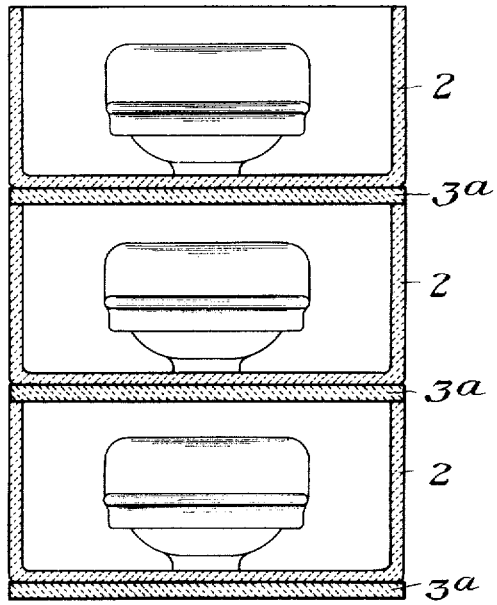

Figure 1 is a side elevation showing one form of sagger structure made in accordance with my invention; and Figure 2 is a similar view, showing a modified form.

My invention relates to the burning of ceramic ware in kilns, and is designed to overcome the difficulty heretofore present by reason of the warping, cracking and sagging of sagger bottoms.

In the burning of ceramic ware, such as sanitary ware, the molded ware is often of large size and the strain put upon the saggers when several of these are superimposed in the kiln is very great. Consequently, the life of these saggers is short, due to cracking, warping or settling, in such a way as to cause the ware to deform and become ruined. Sometimes these saggers which are usually made of burnt clay last for only one run.

My invention is designed to overcome this by the use of structural elements made of refractory material other than sagger material. For this purpose, I use electric furnace products, such as silicon carbide, which are so arranged as to carry the strains, either wholly or in part, which were heretofore carried by the weaker clay pieces heretofore used.

Silicon carbide when made into refractory forms by well known processes, has remarkable mechanical strength, not only at normal room temperature, but at the higher ranges of temperature reached in ceramic kilns, which approximate 1350° C. For example, at this temperature, the modulus of rupture of such material is approximately 2200 pounds per square inch, whereas at that temperature the modulus of rupture of fireclay is only about 115 pounds per square inch. Hence, at kiln temperatures a silicon carbide refractory structural member has about nineteen times the resistance to cross breaking that is possessed by fireclay refractory.

In the drawing, Figure 1 shows a pile of superimposed saggers such as are ordinarily used in the burning of sanitary ware. I have here shown the simplest form of a sagger 2, which is a receptacle having a bottom and sides and open at the top. This receptacle may be of any cross sectional shape, as well as of any desired size and depth. In this figure, 3 represents a refractory plate of silicon carbide, for example the bonded refractory mixture described in my U. S. Patent No. 1,042,844. This plate is dropped into the bottom of the sagger and covers nearly all of its bottom, so as to transmit strains to the outer sagger walls. Thus, the central part of the sagger bottom is relieved of its load, and the silicon carbide plate, on account of its high strength and resistance to fracture at the kiln temperatures, is able to withstand the strain for a long period without showing cracking or de-formation. When these plates are used, the life of the sagger has lasted up to several hundred runs. The thickness of the silicon carbide plate or tile which I have used has ordinarily been about one inch, but this, of course, may be varied according to circumstances.

In Figure 2, a modification is shown in which the silicon carbide plate $3^a$, of substantially the same size and shape as the outside dimensions of a sagger bottom, is placed between each of the saggers 2 of the pile. In this case, again, the silicon carbide plate receives the vertical load in the bottoms of the saggers and transfers it to the sagger walls, which are well able to carry simple compressive stresses. Other electric furnace products than silicon carbide may be employed, such products being preferably added to sagger material in forming the structural members; and material other than abrasives produced in the electric furnace may be employed for this purpose, such material being, however, such as to give greater strength under firing temperatures than would be afforded by the sagger material itself.

I have shown and described only one-piece saggers, but my invention can likewise be applied to saggers or kiln refractories in which the side walls of the container are made separable from the bottom, or in which the side walls are made in one piece or in segments, or in which the sagger may be divided in other ways. Other materials may be used than silicon carbide, within my broader claims, and the shape and size of the supporting member may be varied as desired.

I claim:

1. In sagger construction, a refractory structural supporting member, containing a material other and stronger than sagger material.

2. In sagger construction, a refractory structural supporting member, containing bonded abrasive material having a high heat resistance and resistance to bending strains.

3. A pile of saggers having an interposed refractory structural member formed of material having a higher heat resistance to bending stresses under the furnace temperatures than the sagger material.

In testimony whereof I have hereunto set my hand.

FRANK J. TONE.

Certificate of Correction.

It is hereby certified that in Letters Patent No. 1,448,011, granted March 13, 1923, upon the application of Frank J. Tone, of Niagara Falls, New York, for an improvement in "Sagger Structures," an error appears in the printed specification requiring correction as follows: Page 2, after line 19 insert the following claims as 4 and 5:

*4. A structural member for sagger construction, consisting of a silicon carbide plate.*

*5. A sagger pile having interposed therein a silicon carbide plate.;* and that the said Letters Patent should be read with this correction therein that the same may conform to the record of the case in the Patent Office.

Signed and sealed this 17th day of April, A. D., 1923.

[SEAL.]

KARL FENNING,
*Acting Commissioner of Patents.*